July 26, 1932.  G. D. GRAVES  1,869,193
PRODUCTION OF ESTERS FROM ALCOHOLS AND THE SALTS OF ORGANIC ACIDS
Filed Oct. 16, 1928
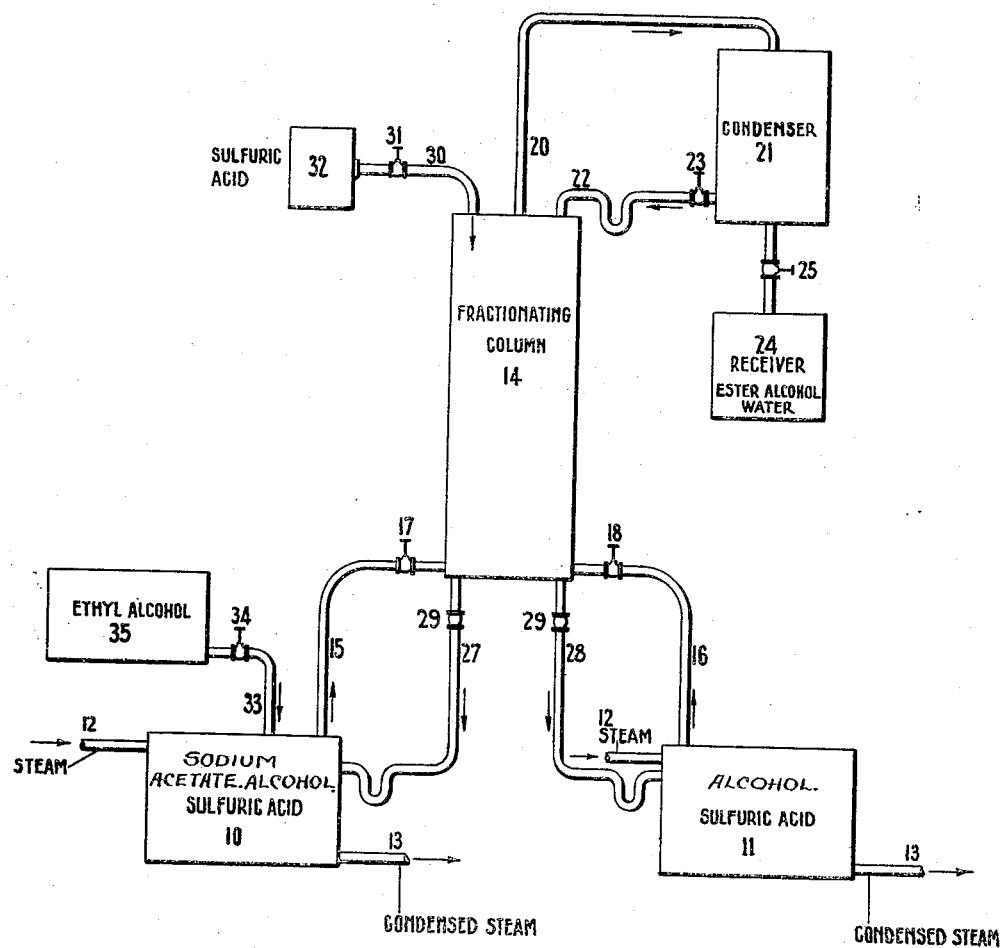
George D. Graves  Inventor
By his attorney Patented July 26, 1932

1,869,193

UNITED STATES PATENT OFFICE

GEORGE D. GRAVES, OF WILMINGTON, DELAWARE, ASSIGNOR TO E. I. DU PONT DE NEMOURS & COMPANY, OF WILMINGTON, DELAWARE, A CORPORATION OF DELAWARE

PRODUCTION OF ESTERS FROM ALCOHOLS AND THE SALTS OF ORGANIC ACIDS

Application filed October 16, 1928. Serial No. 312,771.

This invention relates to the art of producing esters from salts, and more particularly to an improved process and apparatus therefor.

Two methods have been proposed for producing esters from salts by heating a salt of the desired acid with a corresponding alcohol in the presence of sulfuric acid. In the first of these methods the free acid is distilled from a mixture of two mols of the salt with one mol of acid, leaving the neutral sulfate behind, and the product is esterified in a second operation. In the second method the ester is distilled from a mixture of two mols of salt, two mols of alcohol and two mols of acid, leaving behind the acid sulfate salt. The first of these methods is objectionable because it requires two distinct operations, and the second is objectionable because it uses excess acid and produces an acid salt.

I have found that these disadvantages can be overcome by regulating the process so as to prevent the permanent conversion of the acid catalyst into an acid salt, as this results in the cessation of the reaction when only one mol of the desired ester has been produced.

It is therefore an object of this invention to produce a new and improved method of producing esters from salts.

It is another object of this invention to provide a new and useful apparatus therefor.

With the above and other objects in view, which will be apparent as the description proceeds, I have set forth my invention in the following specification and have illustrated it in the accompanying drawing, which discloses a diagrammatic side elevation of an apparatus suitable for carrying out my invention.

In the accompanying drawing 10 and 11 are stills of any suitable acid resisting type, that are heated in any convenient manner, as by steam supplied through pipes 12 and exhausted through pipes 13. 14 is a fractionating column connected with stills 10 and 11 by pipes 15 and 16, which are provided with control valves 17 and 18, respectively. At its top column 14 has an outlet 20 communicating with a condenser 21, from which part of the condensate can be refluxed to the column 14 through a trapped line 22, provided with a regulating valve 23, and the balance of the condensate can be collected in any convenient receiver 24. A valve 25 is provided to control the amount of condensate which passes to receiver 24. Column 14 is also provided with trapped return pipes 27 and 28 leading to the stills 10 and 11, respectively. Column 14 also has suitable valves 29 to permit selective communication with pipes 27 and 28. An additional inlet pipe 30, provided with a control valve 31 connected with a supply tank 32, is also arranged to communicate with the top of column 14. Another inlet pipe 33, provided with a control valve 34 connected with a supply tank 35, is arranged to communicate with still 10, and the latter is preferably provided with any suitable stirring device (not shown).

By way of illustration, but without limiting myself thereto, I have set forth below a suitable method of producing ethyl acetate in accordance with my invention.

Two mols of aqueous sodium acetate and one mol of sulfuric acid, with a small amount of ethyl alcohol, are placed in still 10 and its temperature is brought up to distillation temperature. This converts part of the sodium acetate into ethyl acetate, which passes through pipe 15 into column 14 and thence into the condenser 21, from which part of it is recovered in receiver 24, as a ternary of ethyl acetate, ethyl alcohol and water, and the balance refluxed back to column 14. During this portion of the reaction any acetic acid carried over with the ethyl acetate vapors and as much ethyl alcohol as possible (controlled by the amount of distillate which is refluxed to column 14), is returned to still 10 through pipe 27.

As the alcohol in still 10 is converted into ethyl acetate, additional ethyl alcohol is supplied to still 10 from supply tank 35, the total alcohol added to still 10 being a quantity sufficient to esterify all the acetic acid formed by the other reactions.

When half of the theoretical quantity of ethyl acetate has been removed, sodium acid sulfate is present in still 10 but it contains no more sulfuric acid, and acetic acid begins to distill off.

A small amount of sulfuric acid, to catalyze further reaction between the acetic acid and alcohol, is then supplied to the top of column 14 from supply tank 32, and valves 29 are set to provide communication with pipe 28, thus conducting the acetic acid and alcohol to still 11, which has been provided with a small amount of sulfuric acid. Steam is supplied to still 11 to raise its temperature to the distillation point and this converts the acetic acid into ethyl acetate, which passes through pipe 16 into column 14 and thence to condenser 21 and receiver 24.

Ethyl alcohol is continuously added to still 10, and distillation is continued from both stills until the sodium acetate in still 10 has been completely converted to neutral sodium sulfate.

It is believed that the functioning of my device will be better comprehended by a consideration of the following discussion which is composed partly of functions and results which we know to be facts, and partly of theories which appear at the moment to be the most plausible explanations of the reactions and results.

In the still (10) are sodium acetate, alcohol, and sulfuric acid. When the still is heated the sodium acetate reacts with sulfuric acid to give sodium acid sulfate and acetic acid as follows:

$$H_2SO_4 + CH_3COONa = NaHSO_4 + CH_3COOH.$$

The acetic acid which is thus formed reacts with alcohol under the catalytic influence of the sulfuric acid to form ethyl acetate and water as follows:

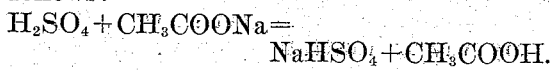
$$(H_2SO_4)$$
$$CH_3COOH + C_2H_5OH = CH_3COOC_2H_5 + H_2O.$$

This ethyl acetate distills off, is liquefied in condenser (21) and is collected in receiver (24). After the $H_2SO_4$ is consumed the sodium acetate reacts with the sodium acid sulfate to give more acetic acid and neutral sodium sulfate as follows:

$$CH_3COONa + NaHSO_4 = CH_3COOH + Na_2SO_4.$$

The process is continued in still (10) until the distilling off of acetic acid indicates that the sulfuric acid in still (10) has been used up. It is to be noticed that in the reactions which take place in still (10) the sulfuric acid acts both as a reagent and as a catalyst. As soon as the mol of sulphuric acid is used up it can act neither as reagent nor catalyst with the result that the reactions will yield acetic acid and neutral sodium sulfate. As soon as this begins to occur and the presence of acetic acid in the reflux indicates that the sulfuric acid is substantially consumed, the reflux valve (29) leading to still (10) is closed and the reflux valve (29) leading to still (11) is opened. In still 11 is sufficient ethyl alcohol to react with the acetic acid which distills over from still 10 and enough sulfuric acid to act as a catalyst for the reaction between the acetic acid and the alcohol. The reaction proceeds as follows:

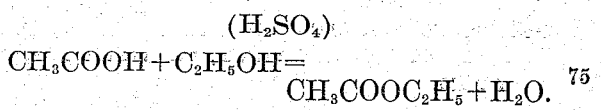
$$(H_2SO_4)$$
$$CH_3COOH + C_2H_5OH = CH_3COOC_2H_5 + H_2O.$$

By the use of this method the advantage is obtained that from a given quantity of reagent substantially quantative yields can be obtained, whereas were the first still alone used and additional sulfuric acid added thereto there would result the formation of two mols of sodium acid sulfate. It will be apparent that by my process large quantities of raw materials are saved.

Two molecules of ethyl acetate are produced, and the yield is about 94% of the theoretical, only one mol of acid is required, and a neutral salt is left in still 10.

Hence it will be apparent that by my new method I am not only enabled to obtain a high yield of ester but I am able to do this in a single operation, without any waste of acid, and obtain a neutral salt.

If desired, the ethyl alcohol which is continuously added to still 10 may be added through the column 14 and the sulfuric acid added at the top of column 14 may be added throughout both stages of the reaction instead of only during the second stage as indicated above. Likewise, if desired, the liquid returned from column 14 to still 10 may be returned to still 11.

The method and apparatus indicated are equally useful for the production of various other salts, such as methyl acetate from sodium acetate and methyl alcohol, and ethyl propionate from sodium propionate and ethyl alcohol.

Although it is necessary to use an aqueous solution of salt, the amount of water present has no effect on the yield.

It will be obvious that various other changes may be made in the apparatus set forth above, in the operating conditions indicated, and in the reactants used, hence it is to be understood that I do not limit myself to the specific embodiments thereof except as defined in the appended patent claims.

I claim:

1. The process of producing ethyl acetate which comprises distilling an aqueous solution containing ethyl alcohol with one mol of sulfuric acid and two mols of sodium acetate, collecting the resulting ethyl acetate until substantially one mol of it has been removed, and thereafter passing the still vapors into ethyl alcohol containing an amount of sulfuric acid sufficient to catalyze the reaction between the still vapors and the ethyl alcohol, and distilling off the resulting ethyl acetate by heating the acetic acid-ethyl alcohol-sulfuric acid mixture.

2. The process of producing ethyl acetate which comprises distilling an aqueous solution containing ethyl alcohol with one mol of sulfuric acid and two mols of sodium acetate, collecting the resulting ethyl acetate until substantially one mol of it has been removed, and thereafter passing the still vapors into ethyl alcohol containing an amount of sulfuric acid sufficient to catalyze the reaction between the still vapors and the ethyl alcohol, and distilling off the resulting ethyl acetate by heating the acetic acid-ethyl alcohol-sulfuric acid mixture, a portion of the distillate being refluxed to maintain the composition of the distillate as near as possible to the theoretical ternary consisting of ethyl alcohol, ethyl acetate, and water.

3. The method of producing ethyl acetate from sodium acetate, sulfuric acid and ethyl alcohol which comprises heating the salt with the acid and the alcohol with the approximate relation of two (2) mols of salt to one (1) mol of acid in a still connected to a fractionating means by two (2) pipes one of which is for carrying the distillate from the still to the means and the other of which is for returning the reflux from the means to the still; collecting the ester as it passes away from the said means and returning the reflux from the said means to the said still until the acid is substantially consumed, and in thereafter directing the reflux from the first still to a second still which contains more alcohol and sufficient acid to act as a catalyst and which said second-named still is connected to the said means in the same manner as the first still; collecting the ester as it passes out of said means; and in continuing both reactions until the first yields no further volatilizable products, and until the second has proceeded to substantial completion.

4. The process of producing organic esters from alcohols and the salts of organic acids which comprises distilling a solution containing an alcohol with the salt of an organic acid in the presence of an amount of sulfuric acid approximately equal to the amount theoretically necessary to change the salt to neutral sulfate, collecting the ester in the distillate until the formation of ester has substantially ceased, and in thereafter passing the distilled products of reaction containing organic acid into contact with more alcohol and sufficient sulfuric acid to catalyze the reaction between the organic acid and the alcohol.

5. The process of producing organic esters from alcohols and the salts of organic acids which comprises distilling a solution containing an aliphatic alcohol with the salt of an organic acid in the presence of an amount of sulfuric acid approximately equal to the amount theoretically necessary to change the salt to neutral sulfate, collecting the ester in the distillate until the formation of ester has substantially ceased, and in thereafter passing the distilled products of reaction containing organic acid into contact with more alcohol and sufficient sulfuric acid to catalyze the reaction between the organic acid and the alcohol.

6. The process of producing organic esters from alcohols and the salts of organic acids which comprises distilling a solution containing an aliphatic alcohol with the alkali metal salt of an organic acid in the presence of an amount of sulfuric acid approximately equal to the amount theoretically necessary to change the salt to neutral sulfate, collecting the ester until the formation of the ester has substantially ceased, and in thereafter passing the distilled products of reaction containing organic acid into contact with more alcohol and sufficient sulfuric acid to catalyze the reaction between the organic acid and the alcohol.

7. The process of producing ethyl acetate which comprises distilling a solution containing ethyl alcohol with an alkali metal acetate in the presence of an amount of sulfuric acid approximately equal to the amount theoretically necessary to change the sodium acetate to neutral sodium sulfate, collecting the ester in the distillate until the formation of the ester has substantially ceased, and in thereafter passing the distilled products of reaction containing acetic acid into contact with more ethyl alcohol and sufficient sulfuric acid to catalyze the reaction between the acetic acid and the alcohol.

8. The process of producing organic esters from alcohols and the salts of organic acids which comprises heating a solution containing an aliphatic alcohol with the salt of an organic acid in the presence of an amount of sulfuric acid approximately equal to the amount theoretically necessary to change the salt to neutral sulfate in a still which is connected to a fractionating means by a pipe; distilling off the ester and refluxing materials of higher boiling point back to said still until the distillate is practically free of ester; thereafter directing the reflux from the fractionating means to a second still containing sulfuric acid and more of the alcohol; distilling off the additional ester formed by the second reaction; and continuing the operation in both stills until the first yields no further esterifiable products and until the reaction in the second yields substantially no more ester.

In testimony whereof, I affix my signature.

GEORGE D. GRAVES.